United States Patent
Takenaka et al.

(10) Patent No.: US 6,355,601 B1
(45) Date of Patent: Mar. 12, 2002

(54) FRICTION MATERIAL

(75) Inventors: Minoru Takenaka, Osaka; Hiroshi Ogawa, Tokushima; Hiroshi Shibutani, Osaka, all of (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/673,144

(22) PCT Filed: Feb. 16, 2000

(86) PCT No.: PCT/JP00/00879

§ 371 Date: Oct. 11, 2000

§ 102(e) Date: Oct. 11, 2000

(87) PCT Pub. No.: WO00/49104

PCT Pub. Date: Aug. 24, 2000

(30) Foreign Application Priority Data

Feb. 19, 1999 (JP) .............................. 11-041587

(51) Int. Cl.$^7$ .............................. C09K 3/14; F16D 69/02
(52) U.S. Cl. .............................. 508/108; 106/36
(58) Field of Search .............................. 508/108; 106/36

(56) References Cited

U.S. PATENT DOCUMENTS

| | | | | |
|---|---|---|---|---|
| 3,387,447 A | * | 6/1968 | Trammell et al. .............. | 106/36 |
| 4,182,437 A | * | 1/1980 | Roberts et al. .......... | 188/251 A |
| 4,324,706 A | * | 4/1982 | Tabe et al. ................... | 523/149 |
| 4,797,139 A | * | 1/1989 | Bauer .......................... | 51/293 |
| 5,266,395 A | * | 11/1993 | Yamashita et al. ........... | 428/292 |
| 5,268,398 A | * | 12/1993 | Nakagawa et al. ......... | 523/158 |
| 5,971,113 A | * | 10/1999 | Kesavan et al. ......... | 188/251 A |

FOREIGN PATENT DOCUMENTS

| | | | |
|---|---|---|---|
| JP | 57116944 | * | 7/1982 |
| JP | 58101183 | * | 6/1983 |
| JP | 05032958 | * | 2/1993 |
| JP | 609944 | | 1/1994 |
| JP | 609945 | | 1/1994 |
| JP | 2000178537 | * | 6/2000 |
| WO | 9527859 | | 10/1995 |
| WO | 9626371 | | 8/1996 |

* cited by examiner

*Primary Examiner*—Jacqueline V. Howard
(74) *Attorney, Agent, or Firm*—Wood, Phillips, VanSanten, Clark & Mortimer

(57) ABSTRACT

An object of the present invention is to provide a friction material having excellent friction and wear characteristics even at a high temperature, and excellent productivity and workability. The friction material of the present invention is blended with scaly boehmite as a friction adjustment agent.

4 Claims, 2 Drawing Sheets

FRICTION MATERIAL

This application is a 371 of PCTJP00/00879 filed Feb. 16, 2000.

TECHNICAL FIELD

The present invention relates to a friction material suitable as a material for braking members used in brake mechanisms of automobiles, aircraft, railroad vehicles, industrial machines, etc., for example as a material for clutch facing, a material for braking, etc.

BACKGROUND ART

Heretofore used as a friction material in the braking members is the friction material formed by dispersing asbestos in an organic or inorganic-binding agent and shaping it through the binding.

However, the friction material of this type has unsatisfactory friction and wear characteristics such as heat resistance, and poses environmental and health problems through carcinogenic asbestos or the like, for which a strong demand on the development of the alternative products exists.

Proposed according to the above demand is a friction material, which employs a potassium titanate fiber as substrate fiber or a friction adjustment agent. The potassium titanate fiber does not have a carcinogenic characteristic, but exhibits an excellent heat resistance, and has an excellent characteristic that is effective for the prevention of the development of fading and improvement in thermostability of a friction characteristic.

However, under the current situation, the problems of causing wear, lowering friction coefficient or any other problems at high temperatures cannot sufficiently be addressed even by the friction material blended with the potassium titanate fiber.

Since the potassium titanate fiber has a fibrous shape, and therefore is bulky and exhibits a poor fluidity, it may pose a problem that it adheres to the wall of a feeding passage during manufacturing, and then plugs the same.

Moreover, the potassium titanate fiber, which is in the form of a fibrous powder, poses problems that it is likely to generate powder dusts, and hence deteriorate a working environment.

Disclosure of Invention

The present invention has been conceived in consideration of the above conventional problems. It is an object of the present invention to provide a friction material having excellent friction and wear characteristics even at a high temperature, as well as excellent productivity and workability.

The friction material of the present invention is characterized in that it is blended with scaly boehmite as a friction adjustment agent.

The scaly (for example, laminar or platy) boehmite used in the present invention is a layered compound having AlO(OH) as a main component, a natural form of which is found as an aluminum hydroxide mineral having a scary shape which contains silicon, titanium, iron, magnesium, calcium, etc., which is broadly distributed in bauxite, and which is produced in a mineral deposit of pyroferrite, kaolinite, or the like.

Also, it is possible to preferably employ, as the scaly boehmite of the present invention, an artificial material such as barium-containing alumina, strontium-containing alumina, magnesium-containing alumina, calcium-containing alumina, magnesium calcium-containing alumina, barium hexa-aluminate, strontium hexa-aluminate, magnesium hexa-aluminate, calcium hexa-aluminate, magnesium calcium hexa-aluminate, or the like, which are synthesized by hydrothermally reacting aluminum hydroxide, water and an alkaline earth metal compound (hydroxides, acetic acid solutions, etc.) under a pressure of 10 to 100 atm and at a reaction temperature of 150 to 300° C., and then optionally heat-treating the resultant at a temperature of 150 to 1400° C.

These scaly boehmites each have the characteristics as described below:

(1) It belongs to an ortho-rhombic system in the crystallographic structure, and is an intercalation compound having a layer structure.

(2) It is typically in the form of hexagonal plate or rhomboid with a major axis of about 0.1 to 10 $\mu$m and a minor axis (thickness) of about 0.01 to 0.3 $\mu$m.

(3) It has a Mohs Hardness Value (Old Mohs Hardness Value) of 3.5 to 4.0, and exhibits a low aggressiveness toward an opposite material when used in the friction material.

(4) It has a low reactivity to water, and is little soluble in acids, alkalis.

The characteristic as described above, which each scaly boehmite has, is much advantageous as a raw material of the friction material.

The friction material having the above structure stably has excellent friction coefficient and wear resistance throughout a wide temperature range from a low temperature to a high temperature. Therefore, when used as a material for braking members used in automobiles, railroad vehicles, aircraft, various industrial machines, etc., for example as a material for clutch facing, and a material for braking such as a brake lining and a disk pad, the friction material achieves improved and stabilized braking function, and also obtains an effect to improve an useful life.

The amount of the scaly boehmite to be blended in the friction material of the present invention can be in the range of 3 to 50 weight percent. The friction material having the scaly boehmite of not less than 3 weight percent can provide sufficient appearance of an improved effect on the friction characteristic. There are no benefits in blending the scaly boehmite of more than 50 weight percent.

The scaly boehmite in the friction material of the present invention can be an alkaline earth metal-containing alumina or an alkaline earth metal hexa-aluminate.

As an example of the friction material of the present invention, it can be cited a friction material formed from the substrate fiber, the friction adjustment agent and the binding agent. As an example of the blended ratio of each ingredient in the friction material, it can be cited 1 to 60 weight parts of the substrate fiber, 20 to 80 weight parts of the friction adjustment agent, which includes the scaly boehmite, 10 to 40 weight parts of the binding agent, and 0 to 60 weight parts of the other ingredients.

As an example of the substrate fiber, it can be cited resin fiber such as alamido fiber, metallic fiber such as steel fiber and brass fiber, carbon fiber, glass fiber, ceramic fiber, rock fiber, wood pulp or the like. These substrate fibers may be subjected to a surface treatment through an amino silane, epoxysilane, vinyl silane or other silane series-coupling agent, a titanate series-coupling agent, phosphoric ester or the like so as to improve the dispersibility and the adhesiveness to the binding agent.

As the friction adjustment agent, it is possible to use a different friction adjustment agent in conjunction with the scaly boehmite, as far as such addition of the different agent does not deteriorate the effect of the present invention.

As an example, it can be cited vulcanized or unvulcanized, natural or synthetic rubber crumb, cashew resin crumb, organic dust such as resin dust and rubber dust, inorganic powder such as carbon black, graphite powder, molybdenum disulfide, barium sulfide, potassium carbonate, clay, mica, talc, diatomaceous earth, antigorite, sepiolite, montmorillonite, zeolite, sodium trititanate, sodium pentatitanate, potassium hexatitanate, potassium octatitante, or the like, metal powder of copper, aluminum, zinc, iron or the like, oxide powder such as alumina, silica, chromium oxide, titanium oxide and iron oxide. For the sodium titanates and the potassium titanates particularly, potassium hexatitanate and potassium octatitanate), those in both granulated form and platy form are preferably used together in the friction material. Preferably, those in the granulated form have an average granule diameter of 3 to 10 μm, and those in the platy form have an average thickness of 0.05 to 1 μm and an average aspect ratio of 3 to 1000.

When using sodium titanate or potassium titanate in conjunction with the scaly boehmite, the weight ratio of the scaly boehmite to sodium titanate or potassium titanate is preferably in the order of 1:9 to 8:2.

Through such a combination, the friction material having high friction and wear characteristics can be provided.

As an example of the binding agent, it can be cited an organic binding agent of a heat curable resin such as phenolic resin, formaldehyde resin, melamine resin, epoxy resin, acrylic resin, aromatic polyester resin or urea resin, elastomer such as natural rubber, nitrile rubber, butadiene rubber, styrene-butadiene rubber, chloroprene rubber, polyisobutylene rubber, acrylic rubber, high styrene rubber or styrene-propylene-diene-copolymer, thermoplastic resin such as polyamide resin, polyphenylene-sulfide resin, polyether resin, polyimide resin, polyether-ether-ketone resin, or thermoplastic-liquid-crystal-polyester resin, or an inorganic binding agent of alumina sol, silica sol, silicone resin or the like.

In addition to the above ingredients, it is possible to blend the friction material of the present invention with an ingredient such as an antirust agent, lubricant agent, abrasive agent or the like, if necessary.

The method of manufacturing the friction material of the present invention is not limited to a particular one. Rather, it can suitably be manufactured according to a method of manufacturing a conventionally known friction material.

As an example of the method, it can be cited the method including dispersing the substrate fiber in the binding agent, combining the friction adjustment agent with the other ingredients to be blended according to need, and blending them together, preparing the friction material composition, then pouring the composition into a mold, then shaping it through binding effected by applying heat under pressure.

As another example of the method, it can be cited the method including melting and kneading the binding agent with a biaxial extruder, combining it with the substrate fiber, the friction adjustment agent and the other ingredients to be blended according to need, which are fed from a side hopper, and blending them together, extruding and then machining them into a desired shape.

As still another example, it can be cited the method including dispersing the friction material composition in water or the like, and placing it on a wire cloth and dewatering it held thereon to form a sheet shaped composition, shaping it through the binding effected by applying heat under pressure with a press machine, and suitably cutting and polishing the resultant friction material into a desired shape.

In manufacturing the friction material of the present invention, the boehmite as the friction adjustment agent has a scaly shape, thereby improving the fluidity as compared with the material using potassium titanate fiber having a fibrous shape, and hence omitting the possibility of the adhesion to the wall of the feeding passage which may cause the plugging of the passage during the manufacturing.

In addition, the friction adjustment agent of the present invention has a scaly shape, so that there is little possibility of generating dusts such as fiber powder of potassium titanate, thereby improving a working environment.

BEST MODE FOR CARRYING OUT THE INVENTION

The present invention will be further described hereinbelow with the citation of an embodiment, comparative example and test example.

Reference Example

A high purity aluminum hydroxide ($Al(OH)_3$) (purity>99%) and strontium hydroxide ($Sr(OH)_2$) were dispersed in water to form slurry, which was then reacted under a pressure of 10 to 15 atm and at a reaction temperature of 150 to 200° C. for eight hours by using a hydrothermal synthesizing machine, and filtered and dried. As a result, the scaly boehmite (strontium-containing alumina) with a major axis of 0.8 to 1.0 μm and a minor axis of 0.08 to 1 μm was obtained.

Embodiment 15 weight parts of potassium titanate fiber (available from Otsuka Kagaku K. K., under the tradename of "TISMO-D"), 4 weight parts of alamido fiber (available from Toray Industries, Inc., under the tradename of "Kevlar Pulp", with a length of 3 mm), 9 weight parts of a binding agent (phenolic resin), 9 weight parts of an organic additive agent (cashew dust or the like), 30 weight parts of the scaly boehmite (that described in the reference example), and 33 weight parts of the other ingredients (lubricant agent such as graphite, metal powder, oxide powder) were sufficiently mixed together and filled in a mold, shaped through the binding (pressing force: 150 kgf/cm$^2$, at a temperature of 170° C. for five minutes), then released from the mold and subjected to heat treatment (held at 180° C. for three hours). Then, the resultant was subjected to polishing treatment, and thus a test specimen (A) was obtained.

The organic additive agent, lubricant agent, metal powder, and oxide powder used were those commonly added to the friction material.

Comparative Example 16 weight parts of potassium titanate fiber, 3 weight parts of alamido fiber (available from Toray Industries, Inc., under the tradename of "Kevlar Pulp", with a length of 3 mm), 10 weight parts of a binding agent (phenolic resin), 9 weight parts of an organic additive agent (cashew dust or the like), and 63 weight parts of the other ingredients (lubricant agent such as graphite, metal powder, oxide powder) were sufficiently mixed together and filled in a mold, and subjected to the same treatments as those in the embodiment. Thus, a test specimen (B) was obtained.

(Friction and Wear Test)

Figure 1:
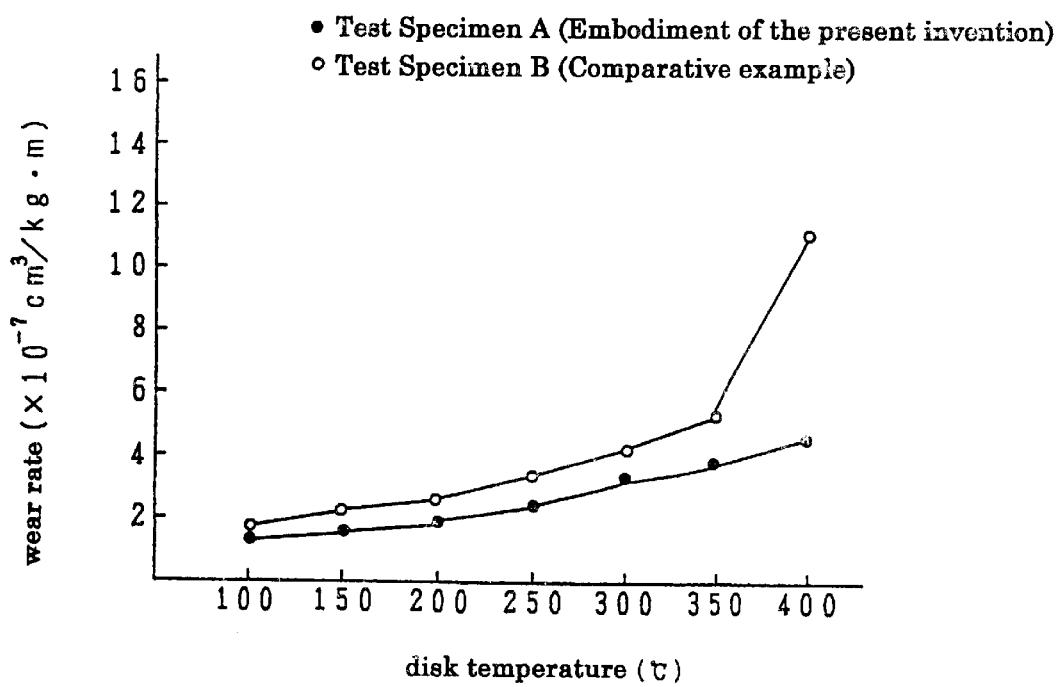
FIG. 1 is a graph of the measured results showing the relationship between the wear rate of friction material and the disk temperature.
Figure 2:
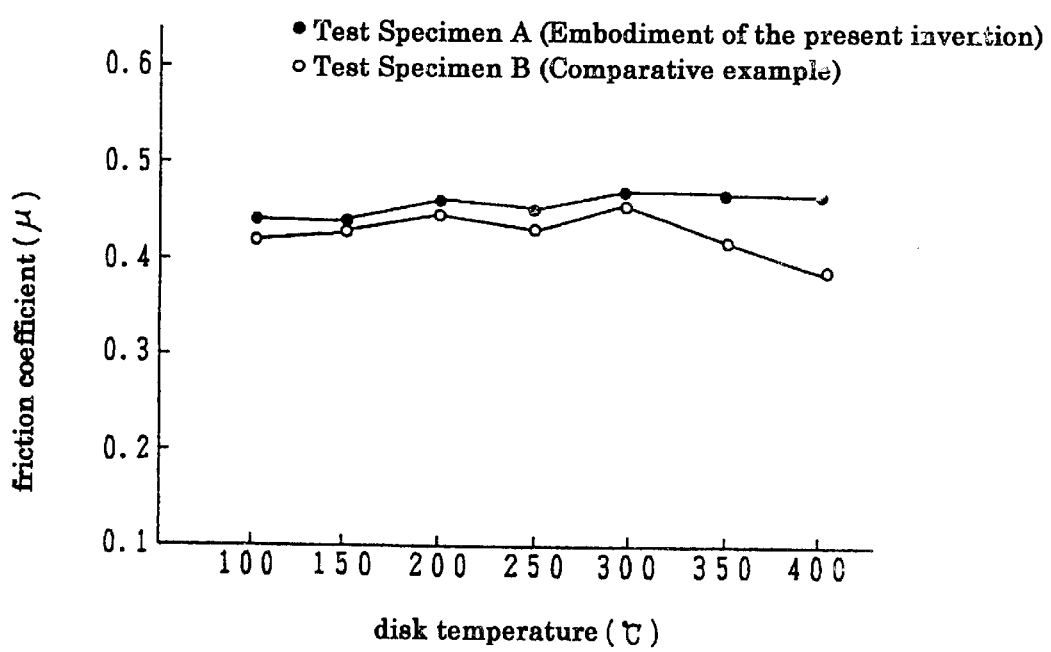
FIG. 2 is a graph of the measured results showing the relationship between the friction coefficient and the disk temperature.

Test pieces were cut respectively from the test specimen (A) and the test specimen (B), and were subjected to a constant-speed friction and wear test (disk friction surface: FC25 gray iron, surface pressure of 10 kgf/cm$^2$, friction speed: 7 m/sec.) according to JIS D4411 (brake linings for automobiles) to measure wear rate (cm$^3$/kg·m) and friction coefficient ($\mu$). The measured results are respectively shown in FIG. 1 (wear rate) and FIG. 2 (friction coefficient).

As is apparent from the test results, the friction material blended with the scaly boehmite (made of test specimen (A)) exhibits a remarkably small variation in friction coefficient even in a temperature range of more than 350° C. as compared with the friction material without the boehmite (made of the specimen (B)), and has improved friction and wear characteristics with a relatively low degree of the deterioration in friction resistance.

As described above, the friction material of the present invention stably has excellent friction coefficient and wear resistance throughout a wide temperature range from a low temperature to a high temperature. Therefore, when used as a material for braking members used in automobiles, railroad vehicles, aircraft, various industrial machines, etc., for example as a material for clutch facing, and a material for braking such as a brake lining and a disk pad, the friction material achieves improved and stabilized braking function, and also obtains an effect to improve an useful life. The boehmite as the friction adjustment agent having a scaly shape can prevent the plugging of the feeding passage during the manufacturing, lower the possibility of generating dusts, and therefore have excellent productivity and workability.

What is claimed is:

1. A friction material characterized in that said friction material is blended with scaly boehmite as a friction adjustment agent.

2. A friction material according to claim 1, wherein said friction material is blended with 3 to 50 weight percent of said scaly boehmite.

3. A friction material according to claim 2, wherein said scaly boehmite is an alkaline earth metal-containing alumina or an alkaline earth metal hexa-aluminate.

4. A friction material according to claim 1, wherein said scaley boehmite is an alkamine earth metal-containing alumina or an alkaline earth metal hexa-aluminate.

* * * * *